US011335368B2

(12) United States Patent
Sumiya

(10) Patent No.: US 11,335,368 B2
(45) Date of Patent: May 17, 2022

(54) RECORDING TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/198,253

(22) Filed: Mar. 11, 2021

(65) Prior Publication Data

US 2021/0295869 A1 Sep. 23, 2021

(30) Foreign Application Priority Data

Mar. 23, 2020 (JP) .............................. JP2020-051710

(51) Int. Cl.
  *G11B 23/02* (2006.01)
  *G11B 5/78* (2006.01)
  *G11B 23/027* (2006.01)
  *G11B 23/04* (2006.01)
(52) U.S. Cl.
  CPC .............. *G11B 5/78* (2013.01); *G11B 23/027* (2013.01); *G11B 23/042* (2013.01)
(58) Field of Classification Search
  None
  See application file for complete search history.

(56) References Cited

U.S. PATENT DOCUMENTS

| 6,452,745 B1 * | 9/2002 | Shiga ................... | G11B 23/037 |
| | | | 360/132 |
| 2003/0002214 A1 * | 1/2003 | Kitamura .............. | G11B 23/113 |
| | | | 360/132 |

FOREIGN PATENT DOCUMENTS

| EP | 1104929 A1 * | 6/2001 | ........... G11B 23/107 |
| JP | H11-238334 A | 8/1999 | |
| JP | 2009217886 A * | 9/2009 | |

* cited by examiner

*Primary Examiner* — William J Klimowicz
(74) *Attorney, Agent, or Firm* — SOLARIS Intellectual Property Group, PLLC

(57) ABSTRACT

Provided is a recording tape cartridge including: a case that is configured by causing a peripheral wall of an upper case and a peripheral wall of a lower case to abut against each other and accommodates a reel on which a recording tape is wound; a reference surface that is formed on the lower case and serves as a reference in an axial direction of the reel in a case where the case is loaded into a drive device; a noncontact communication medium on which individual information is recorded, the noncontact communication medium being accommodated in the lower case and having a plate shape; a supporting portion that is formed on the lower case and supports the noncontact communication medium such that the noncontact communication medium is disposed while being inclined with respect to the reference surface at an angle of approximately 45 degrees; a position restricting portion that is formed on the lower case and restricts a position of a lower end portion of the noncontact communication medium; and a retaining portion that is formed on the lower case and retains an upper end portion of the noncontact communication medium.

4 Claims, 12 Drawing Sheets

RECORDING TAPE CARTRIDGE

CROSS-REFERENCE TO RELATED APPLICATIONS

This application claims priority under 35 USC 119 from Japanese Patent Application No. 2020-051710 filed Mar. 23, 2020, the disclosure of which is incorporated by reference herein.

BACKGROUND

1. Technical Field

The present disclosure relates to a recording tape cartridge.

2. Related Art

A recording tape cartridge into which a noncontact communication medium capable of noncontact communication is built is known in the related art (for example, refer to JP1999-238334A (JP-H11-238334A)). In the noncontact communication medium, individual information such as a unique ID, product type identification, use history, production history, and an index of data recorded on a recording tape of the recording tape cartridge are recorded.

SUMMARY

Meanwhile, in a case where the capacity of the recording tape cartridge is made high, the capacity of the noncontact communication medium also needs to be made high. Since the communication distance of an inexpensive noncontact communication medium having a high capacity is short, it is important to secure communication performance with respect to a noncontact reading and writing device provided in a drive device into which the recording tape cartridge is loaded.

Here, in order to secure the communication performance, it is conceivable to increase the outer diameter and the inner diameter of a wire (antenna) formed in a coil shape (increase magnetic flux passing through antenna) by decreasing a line width without a decrease in entire length of the coil-shaped wire constituting an antenna of the noncontact communication medium.

However, in this case, it is necessary to prevent a rib or the like formed in the case from coming into contact with the antenna. That is, in a case where the rib or the like comes into contact with the antenna, the wire constituting the antenna is likely to be disconnected and the communication performance with respect to the noncontact reading and writing device is inhibited. Meanwhile, in a case where the rib or the like is removed, the noncontact communication medium is not positioned with respect to the case and thus the communication performance with respect to the noncontact reading and writing device is inhibited also in this case.

Therefore, an object of the present disclosure is to obtain a recording tape cartridge with which it is possible to position a noncontact communication medium with respect to a case and suppress disconnection of an antenna.

In order to achieve the object as described above, a recording tape cartridge according to an aspect of the present disclosure comprises: a case that is configured by causing a peripheral wall of an upper case and a peripheral wall of a lower case to abut against each other and accommodates a reel on which a recording tape is wound; a reference surface that is formed on the lower case and serves as a reference in an axial direction of the reel in a case where the case is loaded into a drive device; a noncontact communication medium on which individual information is recorded, the noncontact communication medium being accommodated in the lower case and having a plate shape; a supporting portion that is formed on the lower case and supports the noncontact communication medium such that the noncontact communication medium is disposed while being inclined with respect to the reference surface at an angle of approximately 45 degrees; a position restricting portion that is formed on the lower case and restricts a position of a lower end portion of the noncontact communication medium; and a retaining portion that is formed on the lower case and retains an upper end portion of the noncontact communication medium.

According to the present disclosure, it is possible to position a noncontact communication medium with respect to a case and suppress disconnection of an antenna.

BRIEF DESCRIPTION OF THE DRAWINGS

Exemplary embodiments of the present invention will be described in detail based on the following figures, wherein.

DETAILED DESCRIPTION

Hereinafter, embodiments according to the present disclosure will be described in detail based on the drawings. For the sake of convenience of description, in FIG. 1, a direction in which a recording tape cartridge 10 is loaded into a drive device is represented by an arrow A and corresponds to a frontward direction (front side) of the recording tape cartridge 10. In addition, a direction along an arrow B orthogonal to the arrow A corresponds to a rightward direction (right side). In addition, a direction orthogonal to the direction along the arrow A and the direction along the arrow B is represented by an arrow C and corresponds to an upward direction (upper side) of the recording tape cartridge 10.

First Embodiment

Figure 1:
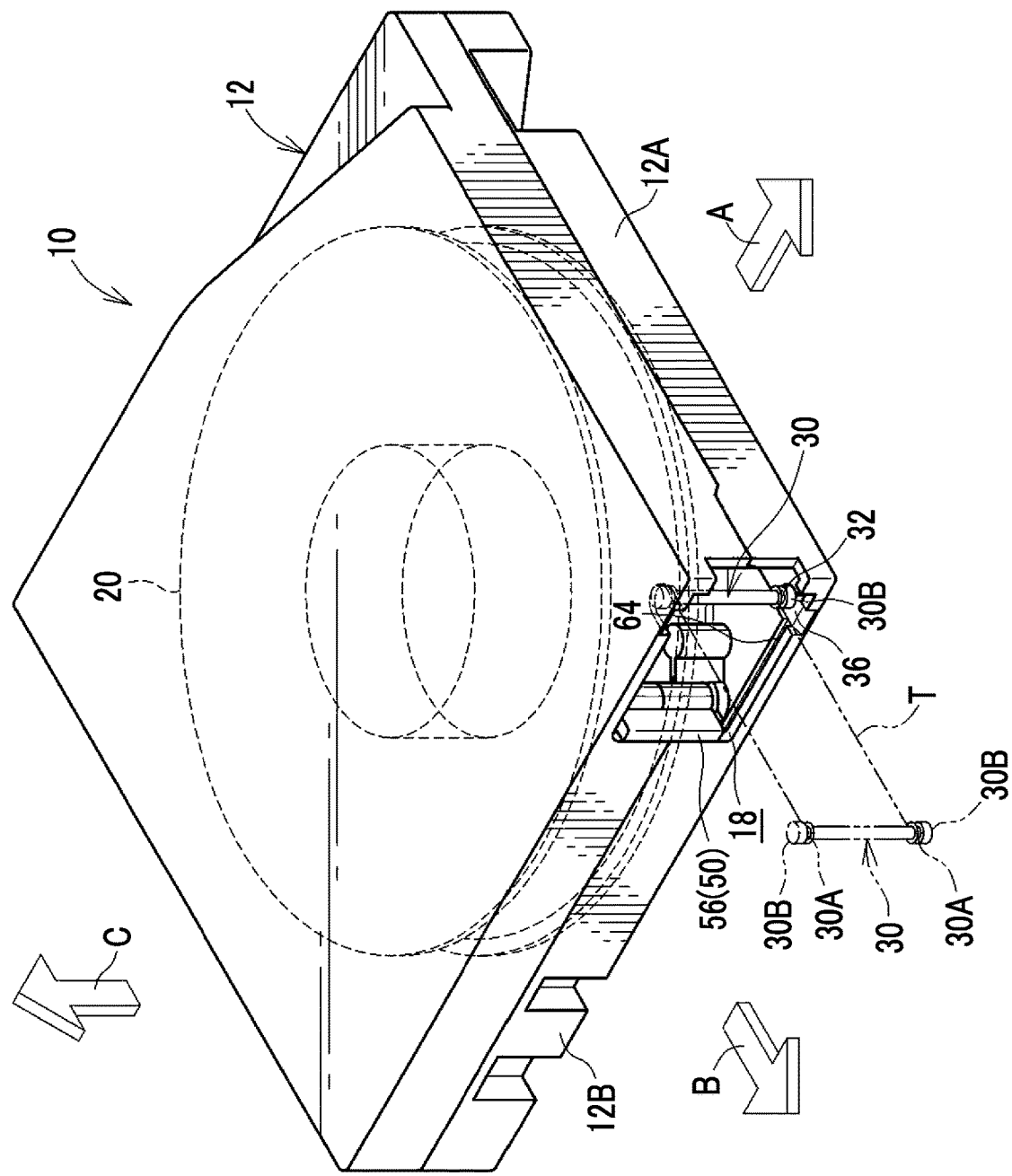
FIG. 1 is a perspective view of a recording tape cartridge according to a first embodiment.
Figure 2:
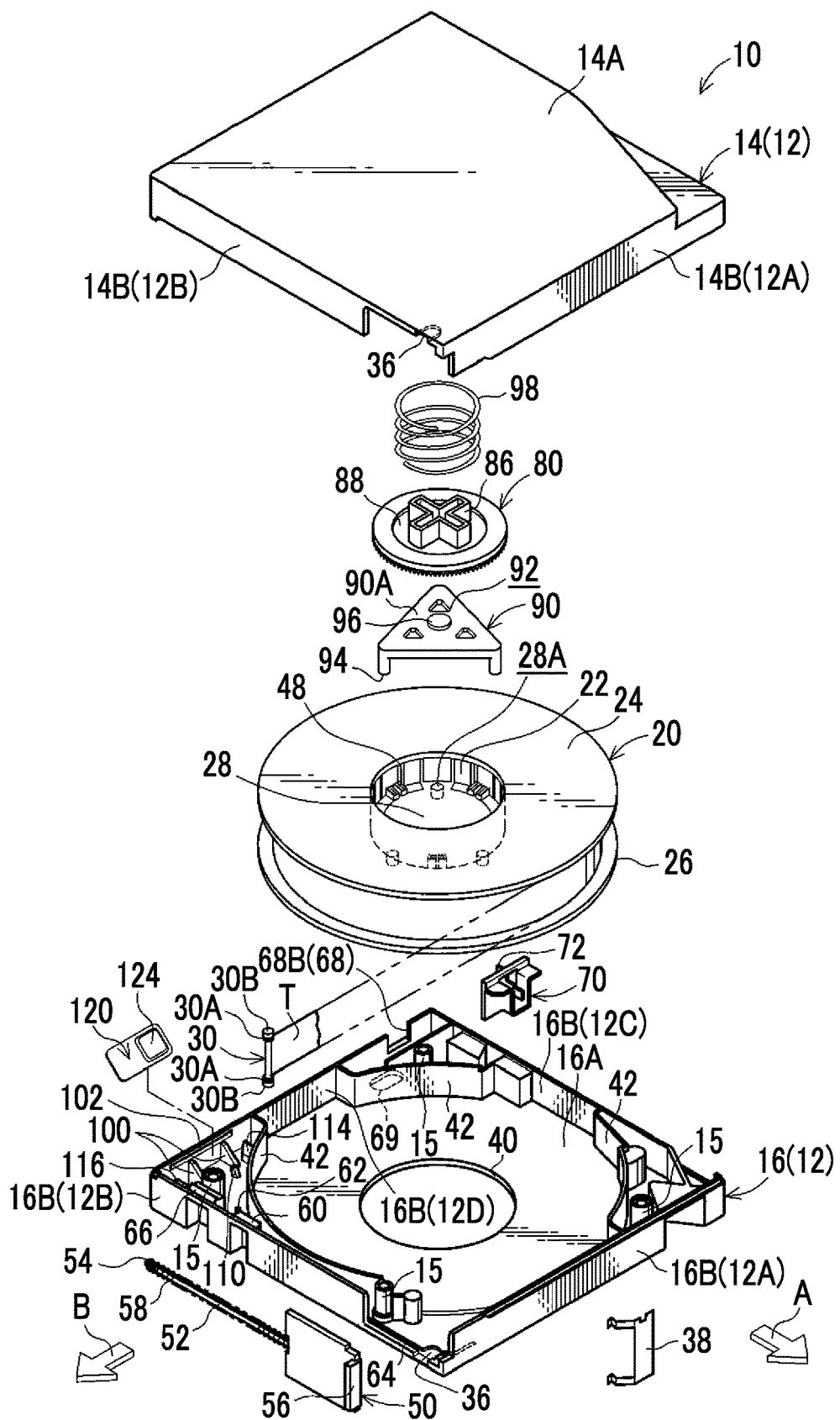
FIG. 2 is an exploded perspective view of the recording tape cartridge according to the first embodiment as seen from above.
Figure 3:
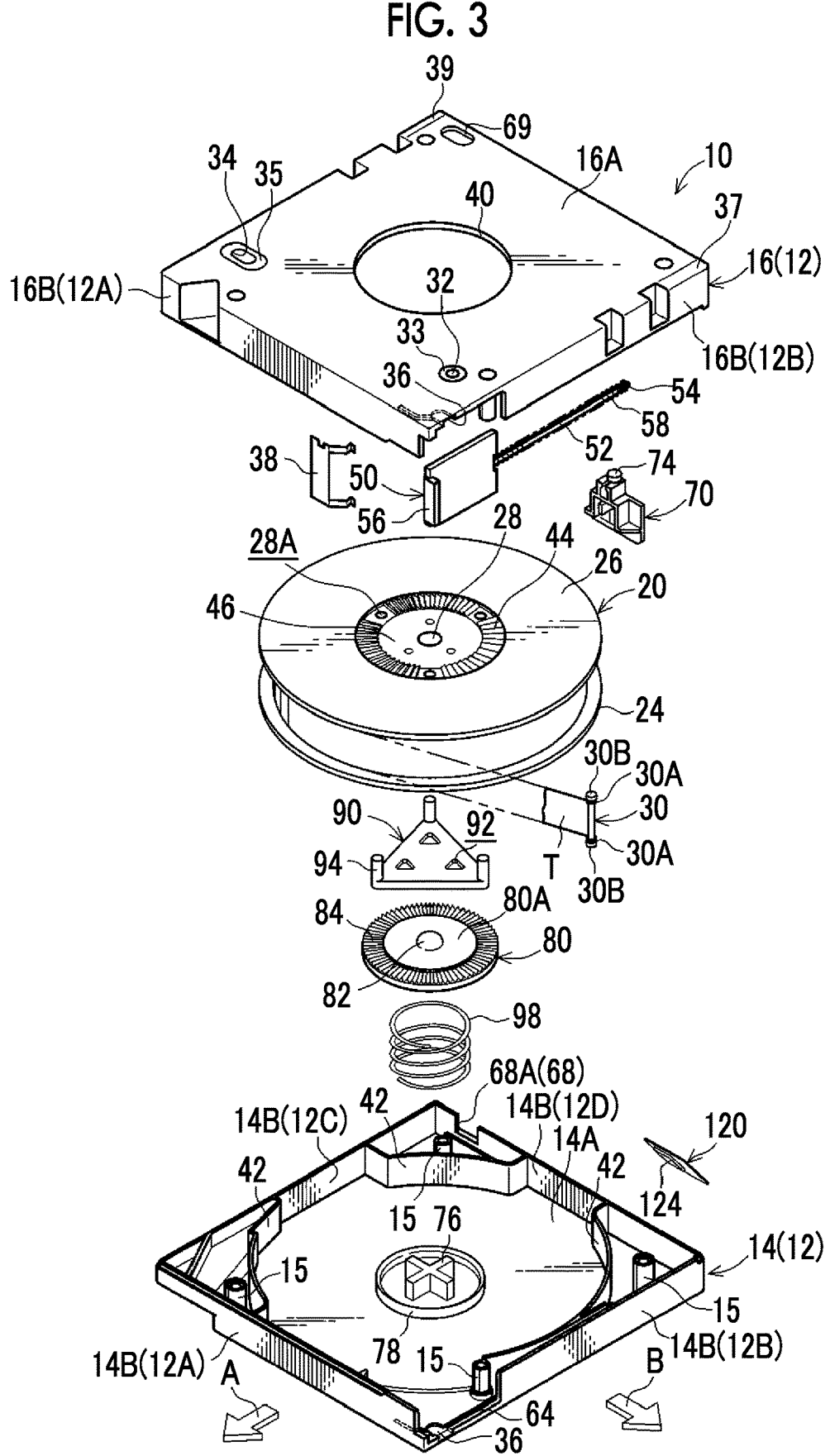
FIG. 3 is an exploded perspective view of the recording tape cartridge according to the first embodiment as seen from below.

First, a first embodiment will be described. As shown in FIGS. 1 to 3, the recording tape cartridge 10 includes a case 12 having an approximately rectangular box shape. The case 12 is configured by bonding an upper case 14 and a lower case 16 through ultrasonic welding, screwing, or the like in a state where a peripheral wall 14B erected on a peripheral edge of a top plate 14A and a peripheral wall 16B erected on a peripheral edge of a bottom plate 16A abut against each other (abutting each other or being close to each other), the upper case 14 and the lower case 16 being made of resin such as polycarbonate (PC).

That is, for example, a screw boss 15 is formed in the vicinity of each corner portion of the upper case 14 and the lower case 16 and the case 12 is assembled with screws (not shown) screwed into the screw bosses 15 from a lower surface side of the lower case 16. In addition, a single reel 20 is rotatably accommodated in the case 12 with a direction along a vertical direction being an axial direction thereof.

The reel 20 is configured by integrally molding a bottomed cylindrical reel hub 22 constituting an axial center portion and a lower flange 26 provided at a lower end portion of the reel hub 22 and welding an upper flange 24 to an upper end portion of the reel hub 22 through ultrasonic welding. In addition, a recording tape T such as a magnetic tape serving as an information recording and reproducing medium is wound on an outer peripheral surface of the reel hub 22, and end portions of the wound recording tape T in a width direction are held by the upper flange 24 and the lower flange 26.

In addition, a reel gear 44 is formed in an annular shape on a lower surface of a bottom wall 28 of the reel hub 22 and a gear opening 40 for exposure of the reel gear 44 to the outside is drilled into a central portion of the lower case 16. With the reel gear 44 exposed through the gear opening 40 and rotationally driven while meshing with a drive gear (not shown) formed on a rotary shaft (not shown) of a drive device (not shown), the reel 20 can rotate relative to the case 12 in the case 12.

In addition, a reel plate 46, which is an annular metal plate made of a magnetic material, is coaxially and integrally fixed to a radially inner side of the reel gear 44 of the lower surface of the bottom wall 28 through insert molding and is adsorbed and held by a magnetic force of an annular magnet (not shown) provided at the rotary shaft of the drive device. Furthermore, the reel 20 is held so as not to wobble by play restricting walls 42 which partially protrude from inner surfaces of the upper case 14 and the lower case 16 and serve as inner walls on a circular trajectory coaxial with the gear opening 40.

In addition, an opening 18 through which the recording tape T wound on the reel 20 is pulled out is formed in a right wall 12B of the case 12. A leader pin 30, which is locked by a pull-out member (not shown) of the drive device and is operated to be pulled out, is fixed to a free end portion of the recording tape T which is pulled out through the opening 18.

Annular grooves 30A are formed on the opposite end portions of the leader pin 30, which protrude further than the end portions of the recording tape T in the width direction, and the annular grooves 30A are locked by a hook or the like of the pull-out member. Accordingly, the hook or the like does not come into contact with the recording tape T and the recording tape T is not damaged in a case where the recording tape T is pulled out.

In addition, in the opening 18 of the case 12, that is, at an inner surface of the top plate 14A of the upper case 14 and an inner surface of the bottom plate 16A of the lower case 16, a pair of upper and lower pin holding portions 36 that positions and holds the leader pin 30 in the case 12 is provided. Each pin holding portion 36 has an approximately semicircular shape of which a side, to which the recording tape T is pulled out, is open and opposite end portions 30B of the leader pin 30 in an upright state can enter and exit the pin holding portions 36 through the open sides.

In addition, a plate spring 38 is fixed and disposed near the pin holding portions 36 and a bifurcating distal end portion of the plate spring 38 engages with the upper and lower opposite end portions 30B of the leader pin 30 such that the leader pin 30 is held at the pin holding portions 36. Note that, in a case where the leader pin 30 enters or exits the pin holding portions 36, the distal end portion of the plate spring 38 is elastically deformed appropriately such that the leader pin 30 is allowed to move.

In addition, the opening 18 is opened and closed by a door 50. The door 50 is formed in an approximately rectangular plate shape that has a size such that the opening 18 can be closed by the door 50 and groove portions 64, into which upper and lower end portions of the door 50 are slidably fitted, are formed in the top plate 14A and the bottom plate 16A inside the opening 18 such that the door 50 can move along the right wall 12B of the case 12.

In addition, a shaft 52 protrudes at the center of a rear end portion of the door 50 and a coil spring 58 is fitted onto the shaft 52. In addition, an expansion portion 54, which prevents the coil spring 58 from falling off, is formed at a rear end of the shaft 52. In addition, a supporting base 60 that includes a locking portion 62 at which a rear end of the coil spring 58 fitted onto the shaft 52 is locked protrudes at the lower case 16.

Accordingly, since the shaft 52 is slidably supported on the supporting base 60 and the rear end of the coil spring 58 is locked at the locking portion 62, the door 50 is urged at all times in a direction, in which the opening 18 is closed, by an urging force of the coil spring 58. Note that, it is preferable that a supporting base 66, which supports the shaft 52 in a case where the opening 18 is opened, is further provided to protrude behind the supporting base 60.

In addition, a projecting portion 56 for an opening and closing operation protrudes outward at a front end portion of the door 50. The projecting portion 56 engages with an opening and closing member (not shown) on the drive device side in a case where the recording tape cartridge 10 is loaded into the drive device. Accordingly, the door 50 is opened against the urging force of the coil spring 58.

In addition, as shown in FIG. 3, a pair of non-through reference holes 32 and 34 is formed in the bottom plate 16A of the lower case 16 at the same position in a front-rear direction, the reference holes 32 and 34 being separated from each other in a lateral direction. The reference hole 32 on the right wall 12B side is formed in an approximately circular shape as seen in a bottom view, and the reference hole 34 on a left wall 12C side is formed in an approximately elliptical shape that is long in the lateral direction as seen in the bottom view.

In addition, in a case where the recording tape cartridge 10 is loaded into the drive device, positioning members (not shown) provided in the drive device are inserted into the reference hole 32 and the reference hole 34, respectively. As a result, the recording tape cartridge 10 (case 12) is positioned in the front-rear direction and the lateral direction in the drive device.

In addition, around the reference hole 32 and the reference hole 34 in the bottom plate 16A, a mirror-finished approximately circular reference surface 33 and a mirror-finished approximately elliptical reference surface 35 are formed. In addition, a reference surface 37 and a reference surface 39, which are mirror-finished and have a rectangular shape (rectangular shape of which the longitudinal direction is parallel to front-rear direction), are also formed at the rear end corners of the bottom plate 16A. Note that, the reference surfaces 33, 35, 37, and 39 are on the same plane.

In a case where the recording tape cartridge 10 is loaded into the drive device, positioning surfaces (not shown) provided in the drive device abut the reference surface 33, the reference surface 35, the reference surface 37, and the reference surface 39, respectively. As a result, a thickness direction of the recording tape cartridge 10 (case 12) (height direction thereof and axial direction of reel 20) is positioned in the drive device.

In addition, as shown in FIGS. 2 and 3, a write protect 70 with which whether or not recording on the recording tape T is allowed is set is provided at a left rear portion of the case 12, the write protect 70 being slidable in the lateral direction. In addition, an opening hole 68, through which an operation projection 72 for manual operation of the write protect 70 protrudes, is formed at a rear wall 12D of the case 12.

The opening hole 68 is formed by a notch portion 68A formed in the peripheral wall 14B of the upper case 14 and a notch portion 68B formed in the peripheral wall 16B of the lower case 16 in a case where the upper case 14 and the lower case 16 are bonded to each other. Further, an elongated hole 69 through which a protrusion portion 74 of the write protect 70 is exposed is drilled into the lower case 16 with the longitudinal direction thereof being parallel to the lateral direction.

In a case where the recording tape cartridge 10 is loaded into the drive device, the position of the write protect 70 is detected on the drive device side such that whether or not recording on the recording tape T is allowed is automatically determined. Note that, the protrusion portion 74 of the write protect 70 does not protrude from a lower surface of the lower case 16.

In addition, a plurality of engaging gears 48 are erected on a peripheral edge of an upper surface of the bottom wall 28 of the reel hub 22 at predetermined gaps (at equal intervals) (for example, three engaging gears are erected at 120-degree intervals) and a plurality of through-holes 28A are drilled into predetermined positions above the reel gear 44 between the engaging gears 48 (in this case, three through-holes are drilled at 120-degree intervals). In addition, a disc-shaped braking member 80 molded of a resin material is provided inside the reel hub 22.

A braking gear 84 that can mesh with the engaging gear 48 is formed in an annular shape on a peripheral edge of a lower surface 80A of the braking member 80. On an upper surface of the braking member 80, an engaging projection 86 into which a rotation restricting rib 76 is inserted and which has an approximately cross shape as seen in a plan view is erected such that the height thereof is slightly higher than the height of the rotation restricting rib 76, the rotation restricting rib 76 protruding downward from the inner surface of the top plate 14A of the upper case 14 and having an approximately cross shape as seen in the plan view. Accordingly, the braking member 80 cannot rotate with respect to the case 12 (upper case 14) and is movable in the vertical direction (axial direction of reel 20) in the reel hub 22.

In addition, a compression coil spring 98 is provided between the upper case 14 and the braking member 80. That is, the compression coil spring 98 is provided in a state where one end thereof abuts the inside of an annular projection 78 (between rotation restricting rib 76 and annular projection 78) protrudes outside the rotation restricting rib 76 of the upper case 14 and the other end abuts the inside of an annular groove 88 provided on the upper surface of the braking member 80. The braking member 80 is urged downward by the urging force of the compression coil spring 98 at all times.

Therefore, in a case where the recording tape cartridge 10 is not in use (where recording tape cartridge is not loaded in drive device), the braking gear 84 is in a state of meshing with the engaging gear 48 at all times and the reel 20 is in a rotation-locked state where the relative rotation of the reel 20 with respect to the case 12 is prevented. Note that, at this time, the reel 20 is pressed against the lower case 16 by the urging force and the reel gear 44 is exposed through the gear opening 40.

In addition, inside the reel hub 22, a releasing member 90 that is molded of a resin material and has an approximately regular triangular shape as seen in the plan view is provided below the braking member 80 (between bottom wall 28 and braking member 80). A plurality of through-holes 92 having a predetermined shape are drilled into the releasing member 90 at appropriate positions (three hexagonal through-holes are drilled in drawing) to reduce the weight of the releasing member 90. In addition, at vertex portions on a lower surface of the releasing member 90, leg portions 94, which are inserted into the through-holes 28A and protrude from the lower surface of the bottom wall 28 over the reel gear 44 by a predetermined height, are provided to protrude.

In addition, a flat supporting projecting portion 96 is formed on the center of an upper surface 90A of the releasing member 90 and an approximately hemispherical releasing projection 82 protruding from the center of the lower surface 80A of the braking member 80 abuts the supporting projecting portion 96 (refer to FIGS. 2 and 3). Accordingly, the area of contact between the braking member 80 and the releasing member 90 is decreased and thus there is a decrease in sliding resistance in the case of use (rotation of reel 20). Note that, as the material of the braking member 80, for example, polyacetal (POM) is used and as the material of the releasing member 90, for example, polybutylene terephthalate (PBT) is used.

Figure 4:
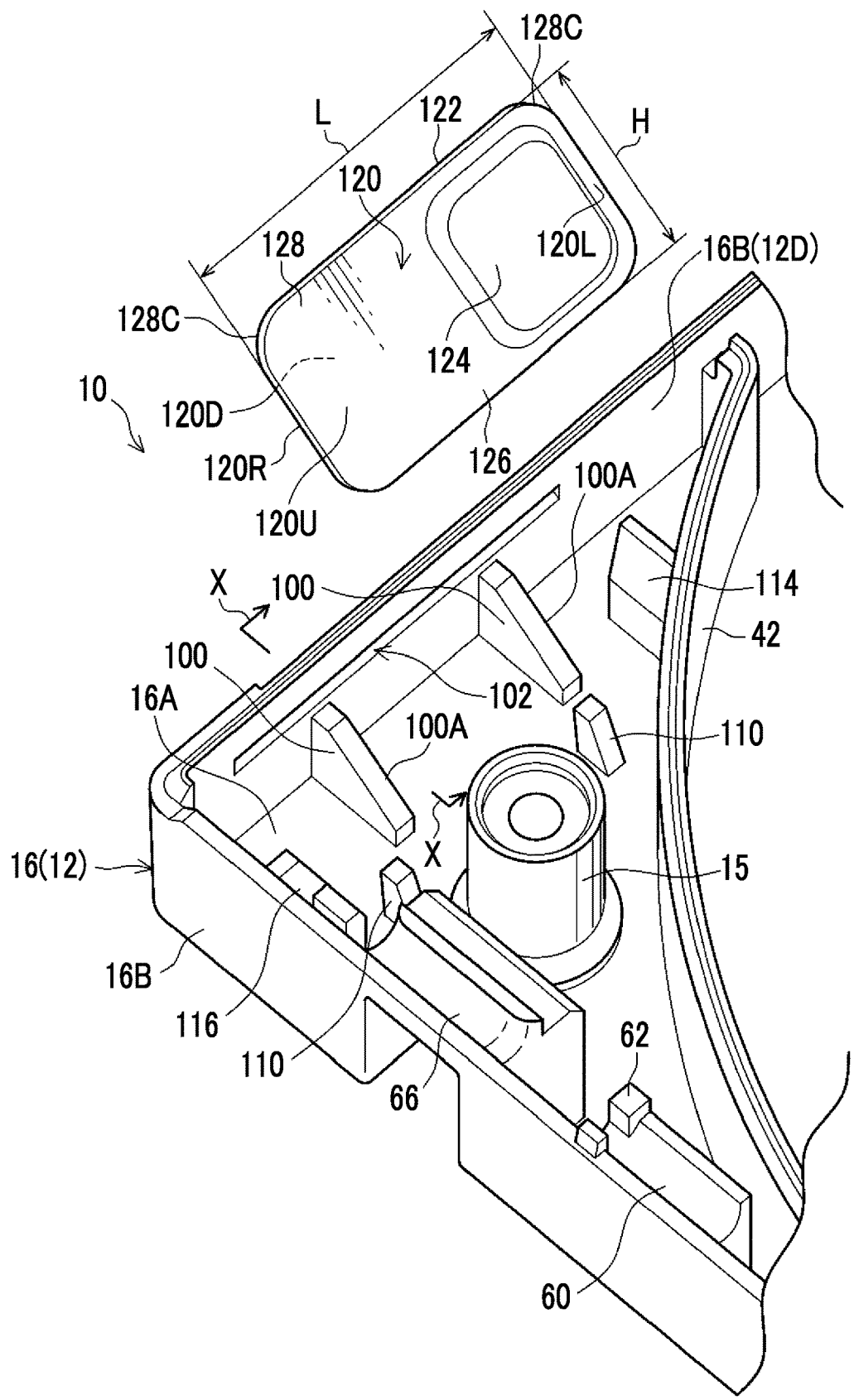
FIG. 4 is a perspective view showing a state before a cartridge memory built into the recording tape cartridge according to the first embodiment is supported by supporting ribs.
Figure 5:
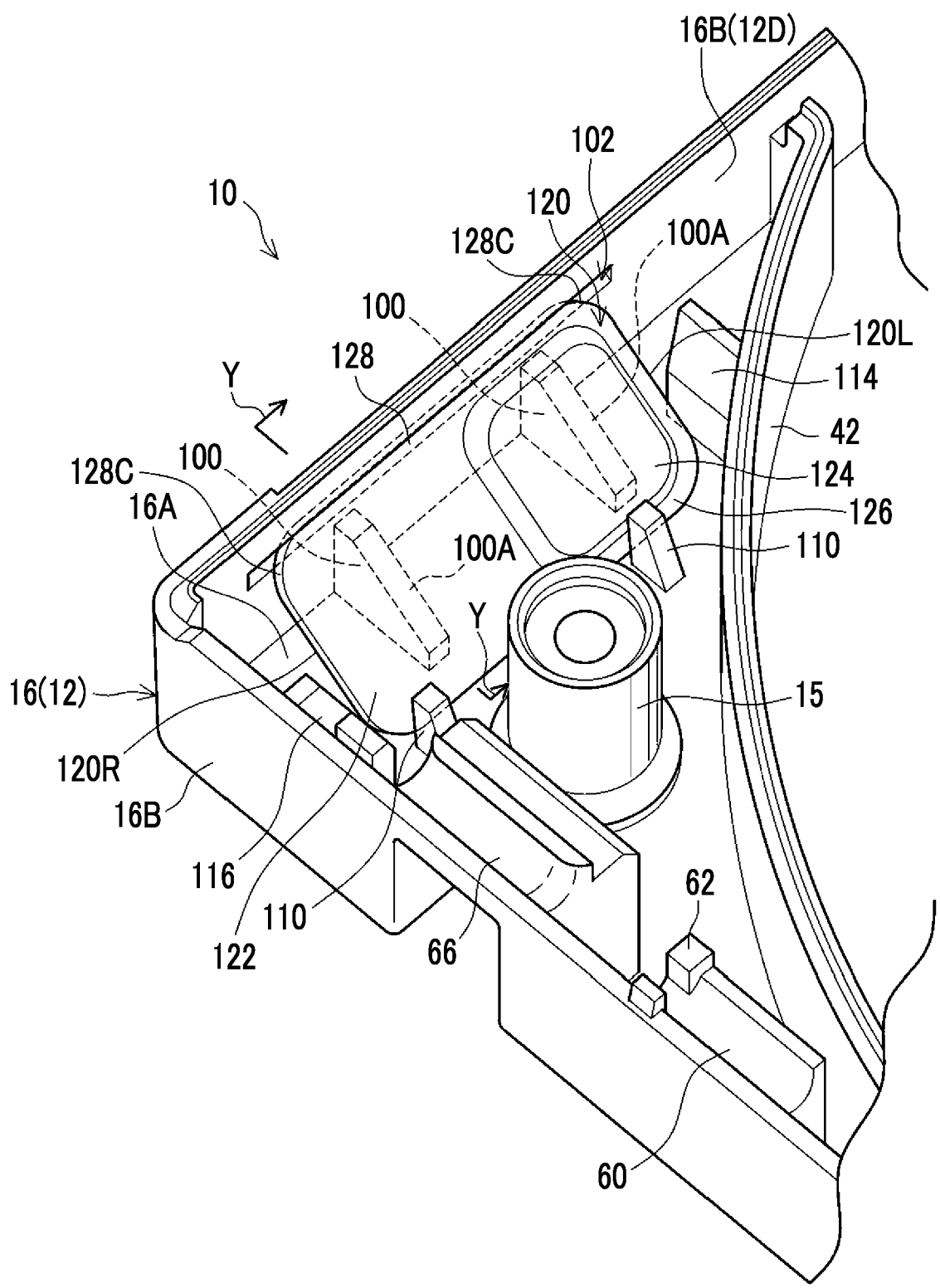
FIG. 5 is a perspective view showing a state after the cartridge memory built into the recording tape cartridge according to the first embodiment is supported by the supporting ribs.
Figure 6:
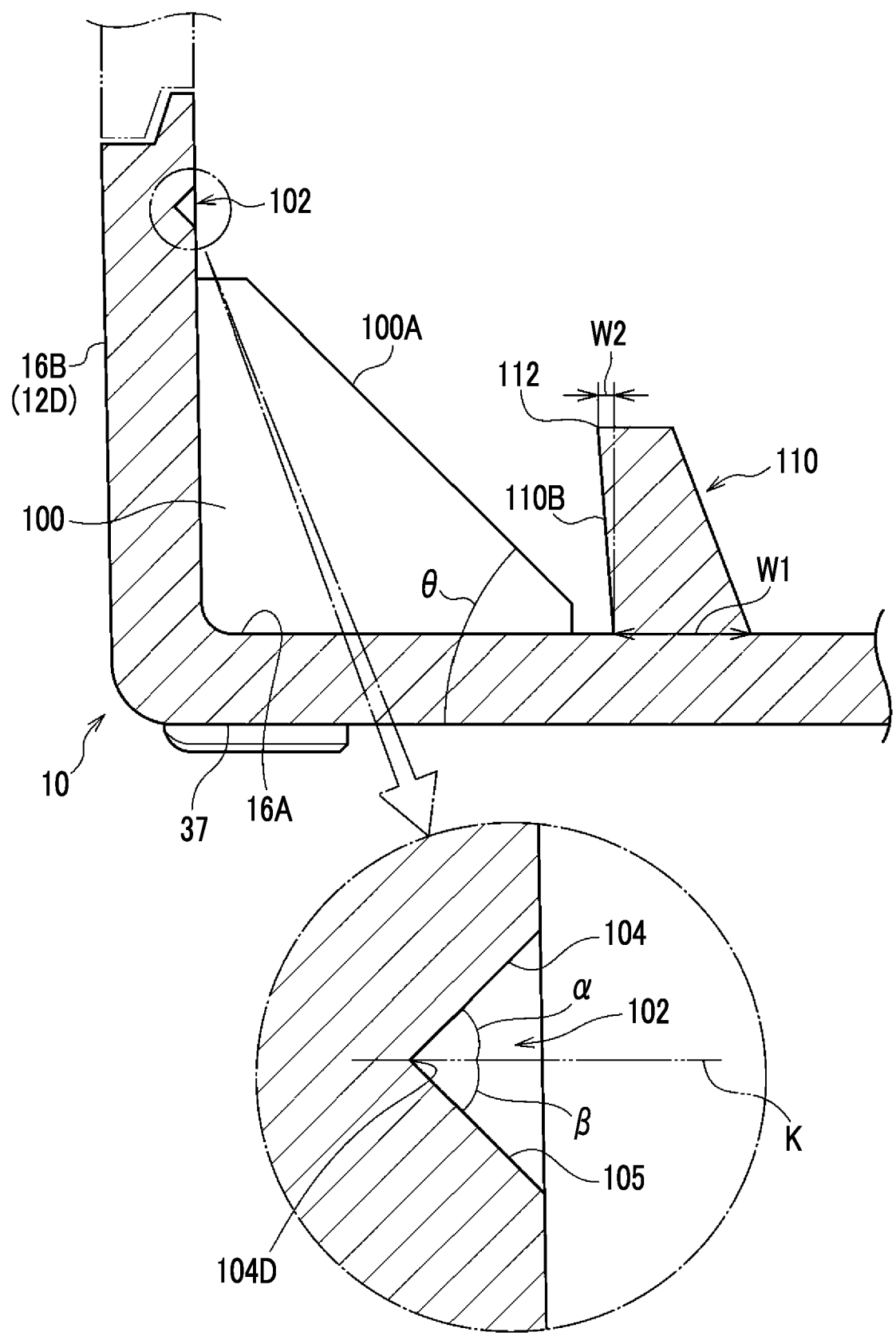
FIG. 6 is a sectional view taken along line X-X in FIG. 4 as seen in the arrow direction.
Figure 7:
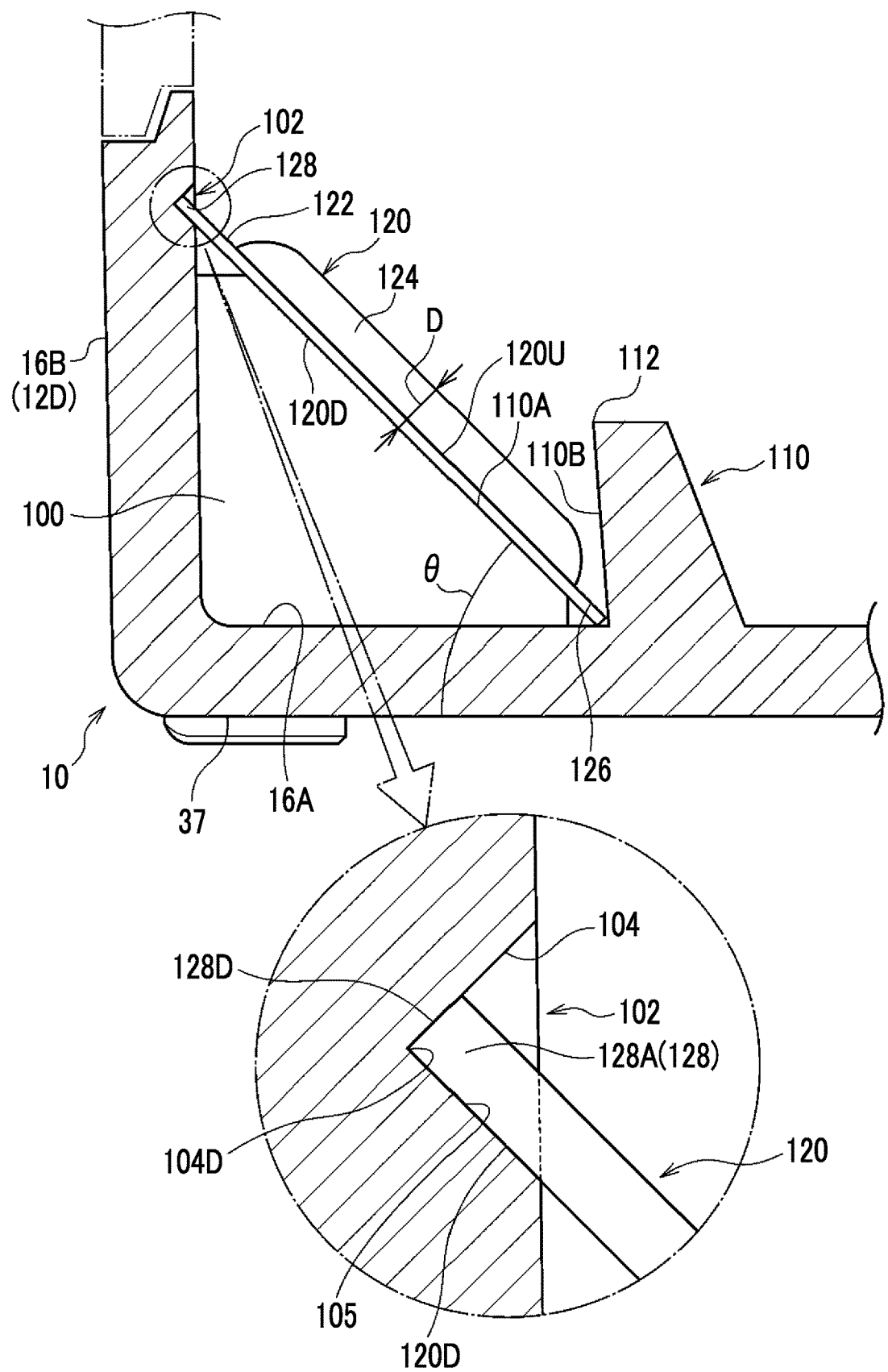
FIG. 7 is a sectional view taken along line Y-Y in FIG. 5 as seen in the arrow direction.

In addition, as shown in FIGS. 2 to 5 and 7, at a right rear portion of the case 12 (lower case 16), a cartridge memory 120 as a noncontact communication medium is disposed while being inclined with respect to the reference surfaces 33, 35, 37, and 39 at a predetermined angle θ (refer to FIGS. 6 and 7). The cartridge memory 120 is formed in an approximately rectangular flat plate shape (approximately rectangular shape as seen in plan view) of which the longitudinal direction is parallel to the lateral direction and the size thereof is defined by a standard.

Specifically, for example, L=20 mm, H=10 mm, and D=1 mm, where the length of the cartridge memory 120 in the lateral direction is L, the length (height) thereof in the vertical direction is H, and the thickness thereof including the thickness of a swollen portion 124 which will be described later is D as shown in FIGS. 4 and 7. Note that, the thickness of an epoxy substrate 122, which will be described later, is 0.1 mm, for example. In addition, the cartridge memory 120 has an extremely light weight of about several g.

Figure 12:
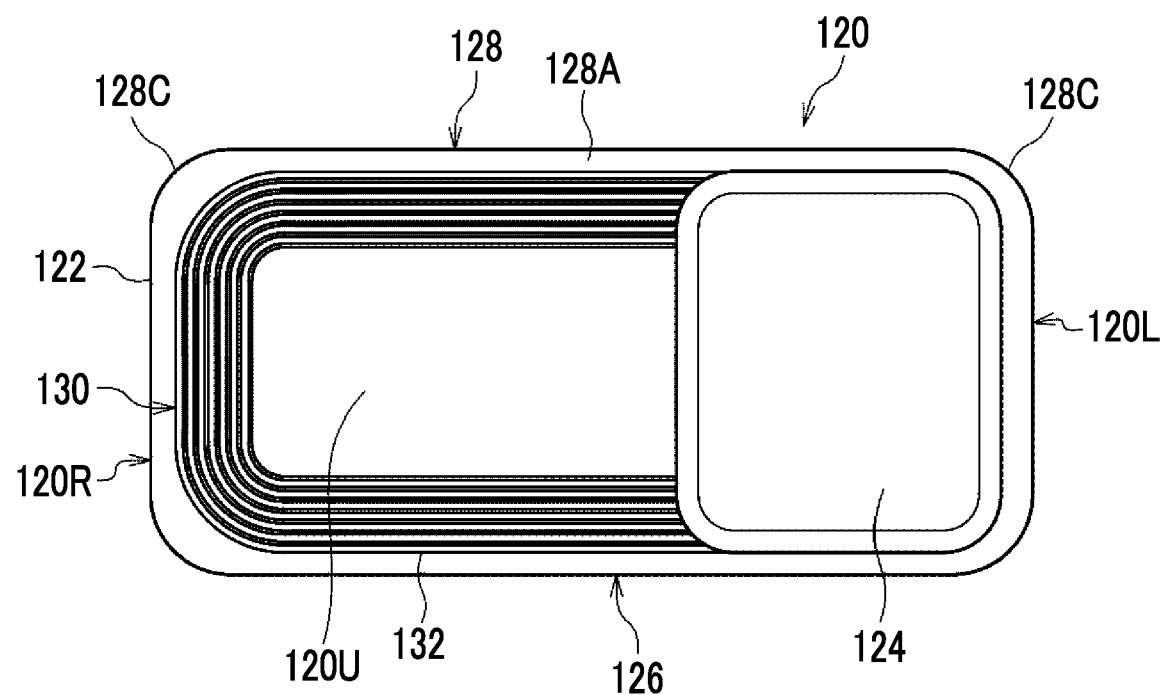
FIG. 12 is a plan view showing a cartridge memory built into a recording tape cartridge according to a present embodiment.

In addition, as shown in FIG. 12, on an upper surface 120U of the cartridge memory 120, a coil-shaped antenna 130 that receives a magnetic field emitted from a noncontact reading and writing device (not shown) provided in the drive device is provided. In addition, the swollen portion 124 of the cartridge memory 120 in which an IC chip (not shown) is sealed and which has an approximately square shape as seen in the plan view is provided on an end portion side on an upper surface 120U in a longitudinal direction.

More specifically, the cartridge memory 120 is composed of the epoxy substrate 122, the IC chip provided on an upper surface of the epoxy substrate 122, a metal wire 132 (antenna 130) that is electrically connected to the IC chip and is provided in a coil shape on an upper surface of the epoxy substrate 122, and the swollen portion 124 that is provided on the upper surface of the epoxy substrate 122, protects the IC chip sealed therein, and is made of ultraviolet curable resin.

Individual information is recorded on the IC chip. Specifically, individual information such as a unique ID, recording capacity, recording format, product type identification, use history, production history, and an index of data recorded on the recording tape T of the recording tape cartridge 10 are recorded on the IC chip. Note that, the capacity of the IC chip is, for example, 4 KB, 8 KB, or 16 KB, which is high. In addition, the IC chip is a so-called microcomputer type IC chip which is low in manufacturing cost and of which the communication distance is relatively short (power consumption is relatively large).

Therefore, in the case of the cartridge memory 120 in the present embodiment, there is a decrease in line width without a change in entire length (decrease in entire length) of the coil-shaped wire 132 constituting the antenna 130 and the outer diameter and the inner diameter of the wire 132 (antenna 130) formed in a coil shape are increased in comparison with a cartridge memory (not shown) in the related art.

That is, in the case of the cartridge memory 120 of the present embodiment, the antenna 130 is disposed close to an outer peripheral side of the epoxy substrate 122 and a magnetic flux passing through the antenna 130 is increased. Therefore, although the communication distance of the cartridge memory 120 is short, the communication performance with respect to the noncontact reading and writing device is secured (improved).

In addition, as shown in FIGS. 2 and 4 to 7, two (one pair of) supporting ribs 100 as supporting portions, on which the cartridge memory 120 is disposed while being inclined at the predetermined angle θ (θ=approximately 45 degrees (specifically θ=45 degrees±5 degrees, preferably θ=45 degrees±2 degrees)), are integrally provided with inner surfaces of the bottom plate 16A and the peripheral wall 16B (rear wall 12D) of the lower case 16 behind the screw boss 15 on the right rear side and the supporting base 66 as seen in a side view such that the supporting ribs 100 protrude at a predetermined interval in the lateral direction.

As shown in FIGS. 6 and 7, the supporting ribs 100 are formed in an approximately right angled triangular shape as seen in the side view and upper surfaces thereof inclined with respect to the reference surfaces 33, 35, 37, and 39 (refer to FIG. 3) of the lower case 16 at the predetermined angle θ are supporting surfaces 100A that support the lower surface 120D of the cartridge memory 120 except for a lower end portion 126. Note that, the lower end portion 126 of the cartridge memory 120 refers to a region on a lower side where the supporting surfaces 100A of the supporting ribs 100 are not in contact with the cartridge memory 120 as seen in the side view.

In addition, as shown in FIGS. 2 and 4 to 7, in an inner surface of an upper portion side of the peripheral wall 16B of the lower case 16, a groove portion 102 as a retaining portion that retains an upper end portion 128 of the cartridge memory 120 from above is formed. The longitudinal direction of the groove portion 102 is parallel to the lateral direction and has an approximately right angled triangular shape as seen in a side view. In addition, the groove portion 102 accommodates a peripheral edge portion 128A of the upper end portion 128 of the cartridge memory 120.

That is, the groove portion 102 includes an inclined surface 104 that an upper end surface 128B of the upper end portion 128 of the cartridge memory 120 abuts and an inclined surface 105 that continues from a lower edge portion 104D of the inclined surface 104, extends obliquely forward and downward, and comes into contact with the lower surface 120D of the upper end portion 128 of the cartridge memory 120 (supports lower surface 120D).

Note that, the peripheral edge portion 128A (accommodated in groove portion 102) of the upper end portion 128 of the cartridge memory 120 is a portion of the upper end portion 128 at which the antenna 130 is not provided (see FIG. 12). In addition, as shown in FIG. 6, in the groove portion 102, $\alpha \le \beta$ and $\alpha \le 0$=approximately 45 degrees, where an angle formed between the inclined surface 104 and a virtual straight line K that extends through the lower edge portion 104D of the inclined surface 104 and is parallel to the reference surfaces 33, 35, 37, and 39 is a and an angle formed between the inclined surface 105 and the virtual straight line K is $\beta$.

In addition, as shown in FIGS. 4 and 5, the length of the groove portion 102 in the lateral direction is equal to or larger than the length L of the cartridge memory 120 in the lateral direction. However, it is preferable that the groove portion 102 is formed as short as possible in the viewpoint of preventing a decrease in strength of the lower case 16. Therefore, for example, the groove portion 102 may be formed to have a length such that upper end portions of arc-shaped corner portions 128C formed on both the right and left sides of the upper end portion 128 of the cartridge memory 120 cannot enter the groove portion 102.

In addition, as shown in FIGS. 4 to 7, two (one pair of) position restricting ribs 110 as position restricting portions extending upward are integrally provided with the inner surface of the bottom plate 16A at a position ahead of the supporting ribs 100 such that the position restricting ribs 110 protrude at a predetermined interval in the lateral direction. The position restricting ribs 110 positionally restrict the lower end portion 126 of the cartridge memory 120 such that the lower end portion 126 is not displaced forward.

That is, the peripheral edge portion 128A of the upper end portion 128 of the cartridge memory 120 is accommodated in the groove portion 102 in a state where the position of the lower end portion 126 is restricted by the position restricting ribs 110 and the cartridge memory 120 is held between the groove portion 102 and the position restricting ribs 110 with the epoxy substrate 122 elastically deformed slightly in a direction along the supporting surfaces 100A. Note that, a length W1 (refer to FIG. 6) of a base portion of each position restricting rib 110 in the front-rear direction is about 2.2 mm.

In addition, each position restricting rib 110 includes an overlapping portion 112 that projects to a position above the cartridge memory 120. That is, a rear end portion 110B of the position restricting rib 110 is inclined rearward with respect to a direction perpendicular to the bottom plate 16A such that an upper end portion is positioned a predetermined length W2 behind a lower end portion (for example, W2=about 0.5 mm (refer to FIG. 6)) as seen in a side view and the upper end portion is the overlapping portion 112.

Figure 8:
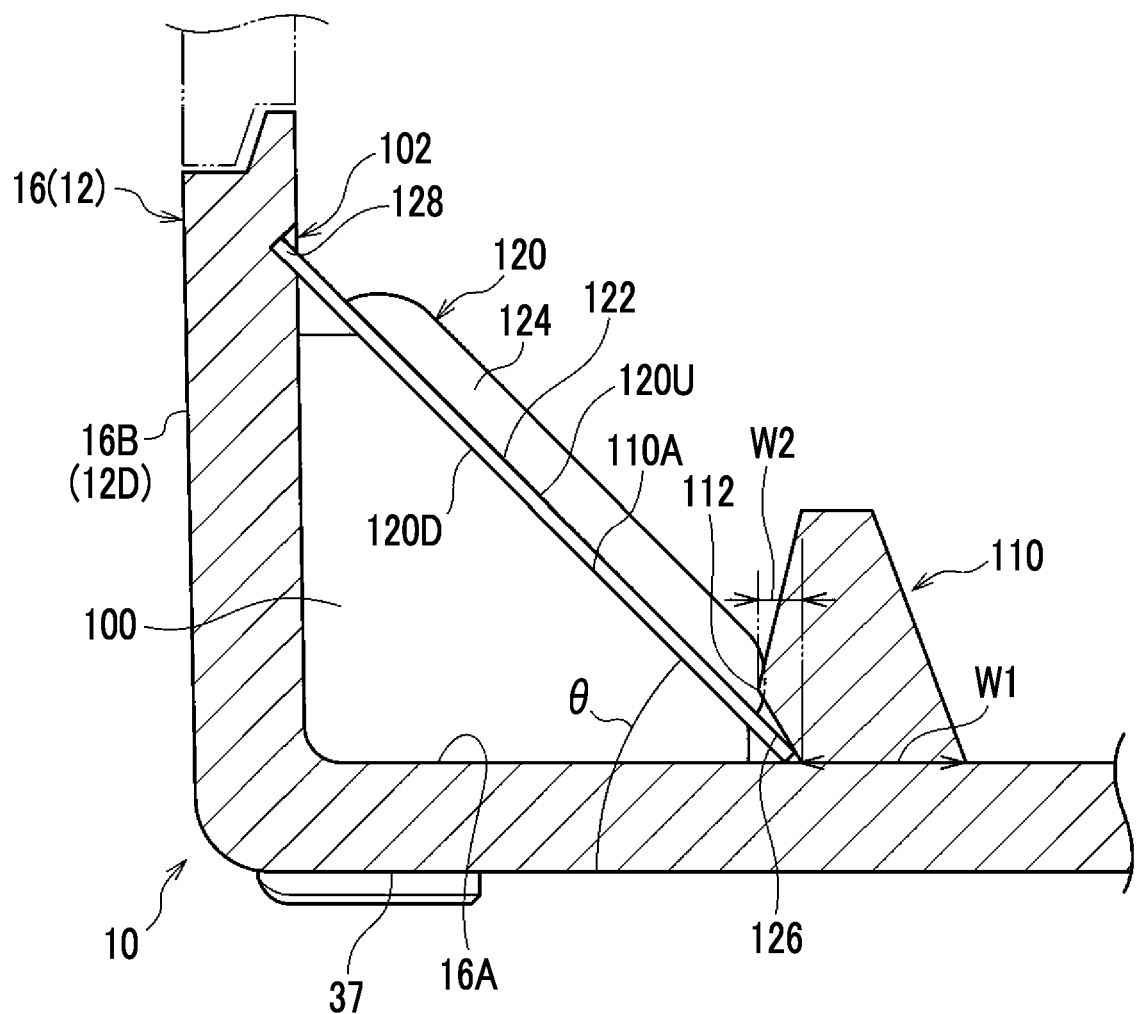
FIG. 8 is a sectional view corresponding to FIG. 7 showing a modification example of the recording tape cartridge according to the first embodiment.

Note that, the overlapping portion 112 formed on the position restricting rib 110 may have a shape as shown in FIG. 8. That is, a lower intermediate portion of the rear end portion 110B of the position restricting rib 110 may protrude rearward forming an obtuse angle with respect to the direction perpendicular to the bottom plate 16A such that the lower intermediate portion is positioned the predetermined length W2 behind the lower end portion (for example, W2=about 0.5 mm) as seen in the side view and the protruding lower intermediate portion may be the overlapping portion 112.

In addition, as shown in FIGS. 2, 4, and 5, a position restricting rib 114 as a position restricting portion that positionally restricts a left end portion 120L of the cartridge memory 120 (epoxy substrate 122) is integrally provided with the bottom plate 16A while protruding at a position to the left of the supporting ribs 100. Furthermore, a position restricting rib 116 as a position restricting portion that positionally restricts a right end portion 120R of the cartridge memory 120 (epoxy substrate 122) is integrally provided with the bottom plate 16A while protruding at a position to the right of the supporting ribs 100.

As a result, the position of the cartridge memory 120 is restricted in the front-rear direction and the lateral direction. That is, regardless of the posture of the recording tape cartridge 10 (case 12), the cartridge memory 120 is held without being displaced from a position above the supporting surfaces 100A and is stably disposed while being inclined at the predetermined angle θ.

Therefore, as shown in FIG. 3, the inner surface of the top plate 14A of the upper case 14 is not provided with a position restricting portion that comes into contact with the upper surface 120U of the cartridge memory 120 from above and positionally restricts the upper surface 120U (there is no portion that comes into contact with upper surface 120U).

Next, the operation of the recording tape cartridge 10 according to the first embodiment configured as described above will be described.

The recording tape cartridge 10 is loaded into the drive device with a front wall 12A being at the front. Then, the door 50 slides such that the opening 18 is opened and the positioning members (not shown) provided in the drive device are relatively inserted into the reference hole 32 and the reference hole 34, respectively. In addition, the positioning surfaces (not shown) provided in the drive device relatively abut the reference surface 33, the reference surface 35, the reference surface 37, and the reference surface 39, respectively. As a result, the recording tape cartridge 10 (case 12) is positioned in the front-rear direction, the lateral direction, and the thickness direction (height direction) in the drive device.

In addition, the rotary shaft (not shown) provided in the drive device relatively enters the case through the gear opening 40 and thus the drive gear (not shown) meshes with the reel gear 44. Then, as the drive gear meshes with the reel gear 44, the leg portions 94 protruding over the reel gear 44 are pushed up against the urging force of the compression coil spring 98 and the braking member 80 is pushed upward via the releasing member 90 such that the braking gear 84 and the engaging gear 48 meshing with each other are released from each other.

Then, in a state where the drive gear and the reel gear 44 completely mesh with each other, the reel plate 46 is adsorbed and held by the magnetic force of an annular magnet provided inside the drive gear. Accordingly, the reel 20 enters an unlocked state where a mesh between the reel gear 44 and the drive gear is maintained and the reel 20 can rotate relative to the case 12 in the case 12.

In addition, the noncontact reading and writing device provided in the drive device accesses the IC chip of the cartridge memory 120 from below in a noncontact manner. That is, a magnetic field is emitted from the noncontact reading and writing device and the antenna 130 of the cartridge memory 120 receives the magnetic field. Therefore, an electromotive force is generated and the noncontact reading and writing device reads individual information recorded on the IC chip or writes individual information on the IC chip.

Here, the cartridge memory 120 is disposed while being accurately inclined with respect to the reference surfaces 33, 35, 37, and 39 at the predetermined angle θ (θ=approximately 45 degrees) by means of the supporting ribs 100, the groove portion 102, the position restricting ribs 110, and the position restricting ribs 114 and 116 provided on the lower case 16. Particularly, regarding the groove portion 102, since the angle α formed between the virtual straight line K and the inclined surface 104 and the angle θ formed between the virtual straight line K and the inclined surface 105 satisfy α≤β and α≤θ, it is possible to retain the cartridge memory 120 appropriately (such that peripheral edge portion 128A does not exit groove portion 102) by means of the inclined surface 104.

Therefore, even in a case where the upper case 14 is not provided with a portion that comes into contact with the cartridge memory 120, the cartridge memory 120 is stably held at the angle θ without being displaced from the supporting surfaces 100A. In other words, the cartridge memory 120 can be positioned with respect to the lower case 16, and thus it is possible to suppress or prevent inhibition of the communication performance with respect to the noncontact reading and writing device which is caused by the cartridge memory 120 being not positioned with respect to the lower case 16.

In addition, there is a decrease in line width without a decrease in entire length of the coil-shaped wire 132 constituting the antenna 130 of the cartridge memory 120 and the outer diameter and the inner diameter of the wire 132 (antenna 130) formed in a coil shape are increased (magnetic flux passing through antenna 130 is increased).

Therefore, even in the case of the cartridge memory 120 comprising an IC chip with a low manufacturing cost and a high capacity but a short communication distance, the antenna 130 can receive more magnetic field emitted from the noncontact reading and writing device (can generate more electromotive force).

That is, it is possible to improve the communication performance with respect to the cartridge memory 120 without changing the size of the cartridge memory 120 (epoxy substrate 122), and it is possible to read or write individual information by means of the noncontact reading and writing device with high accuracy. As described above, according to the present embodiment, even in the case of the cartridge memory 120 of which the communication distance is short, it is possible to secure the communication performance thereof.

In addition, as described above, the peripheral edge portion 128A (at which no antenna 130 is provided) of the upper end portion 128 of the cartridge memory 120 is accommodated in the groove portion 102. In addition, the upper case 14 is not provided with a portion that comes into contact with the upper surface 120U of the cartridge memory 120.

Therefore, even in a case where the antenna 130 of which the line width is made small is provided on the upper surface 120U of the cartridge memory 120, it is possible to suppress or prevent disconnection of the wire 132 constituting the antenna 130. It is possible to suppress or prevent inhibition of the communication performance with respect to the noncontact reading and writing device which is caused by disconnection of the wire 132.

In addition, the overlapping portions 112 are formed on the position restricting ribs 110. Therefore, for example, in a case where the recording tape cartridge 10 is manufactured, positional displacement of the cartridge memory 120 having a light weight can be suppressed or prevented by the overlapping portion 112 also even in a case where the lower case 16 with the cartridge memory 120 held between the groove portion 102 and the position restricting ribs 110 is transported (even in case where vibration is applied to lower case 16 before lower case 16 is covered with upper case 14).

In addition, even in a case where the recording tape cartridge 10 is loaded into the drive device, it is possible to make it difficult for the cartridge memory 120 to be displaced upward by means of the overlapping portions 112 (it is possible to make it difficult for cartridge memory 120 to be separated from noncontact reading and writing device). Therefore, it is possible to suppress or prevent a decrease in communication performance with respect to the noncontact reading and writing device.

In a case where data is to be recorded on the recording tape T or data in the recording tape T is to be reproduced, the pull-out member (not shown) provided in the drive device enters the case 12 through the opening 18 in an opened state and the leader pin 30 positioned and held by the pin holding portions 36 is gripped and pulled out by the pull-out member. At this time, the reel 20 can rotate as the leader pin 30 is pulled out since the reel 20 is not in the rotation-locked state.

The leader pin 30 extracted through the opening 18 is accommodated in a take-up reel (not shown) provided in the drive device. Then, as the take-up reel and the reel 20 are rotationally driven in synchronization with each other, the recording tape T is sequentially drawn out from the case 12 while being wound on the take-up reel and data is recorded or reproduced by a recording and reproducing head (not shown) provided along a predetermined tape path. Then, use history, an index of data, and the like are recorded in the cartridge memory 120.

Second Embodiment

Next, a second embodiment will be described. Note that, the same parts as those in the first embodiment are given the same reference numerals and detailed description thereof (including common actions) will be appropriately omitted.

Figure 9:
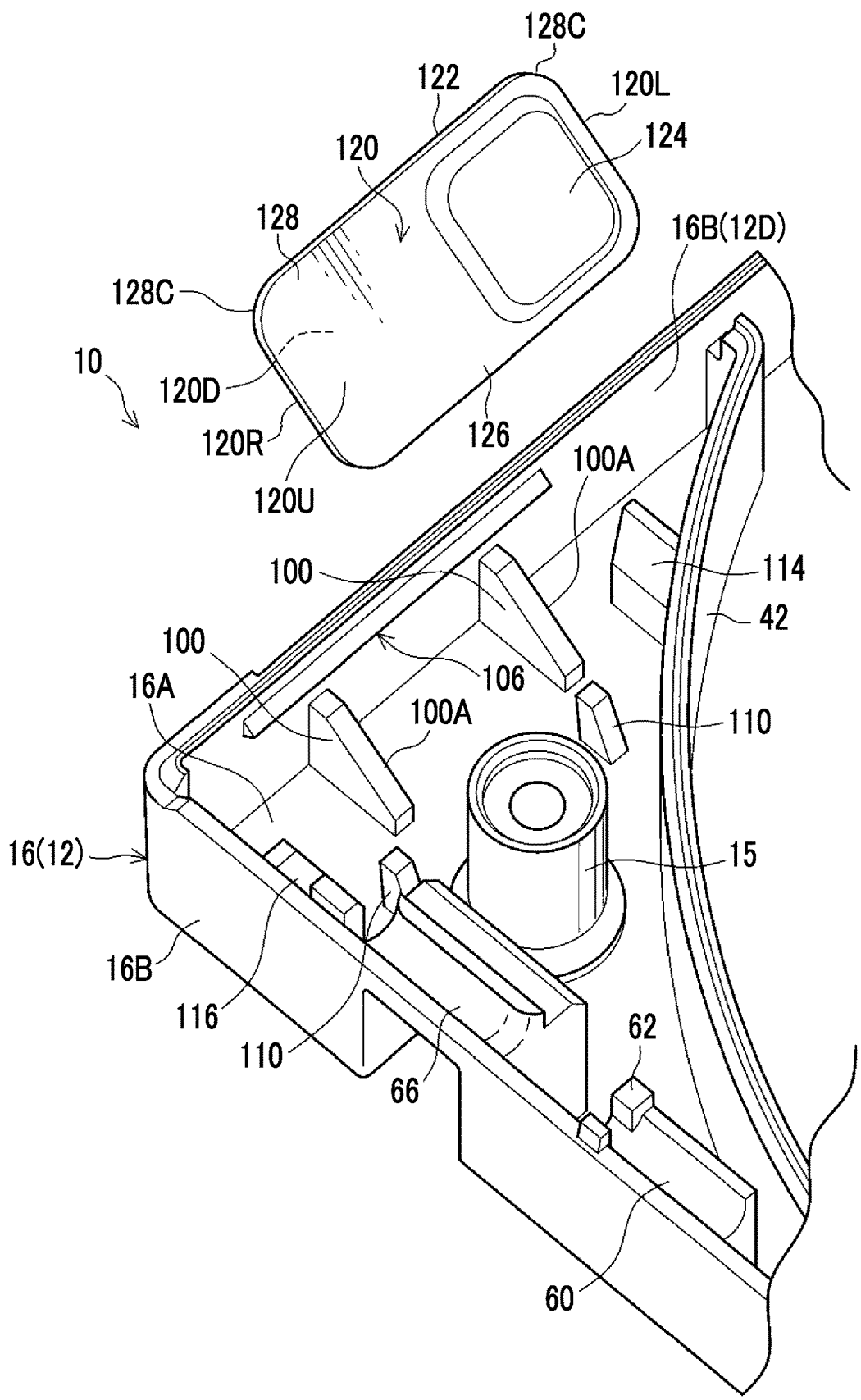
FIG. 9 is a perspective view showing a state before a cartridge memory built into a recording tape cartridge according to a second embodiment is supported by supporting ribs.
Figure 10:
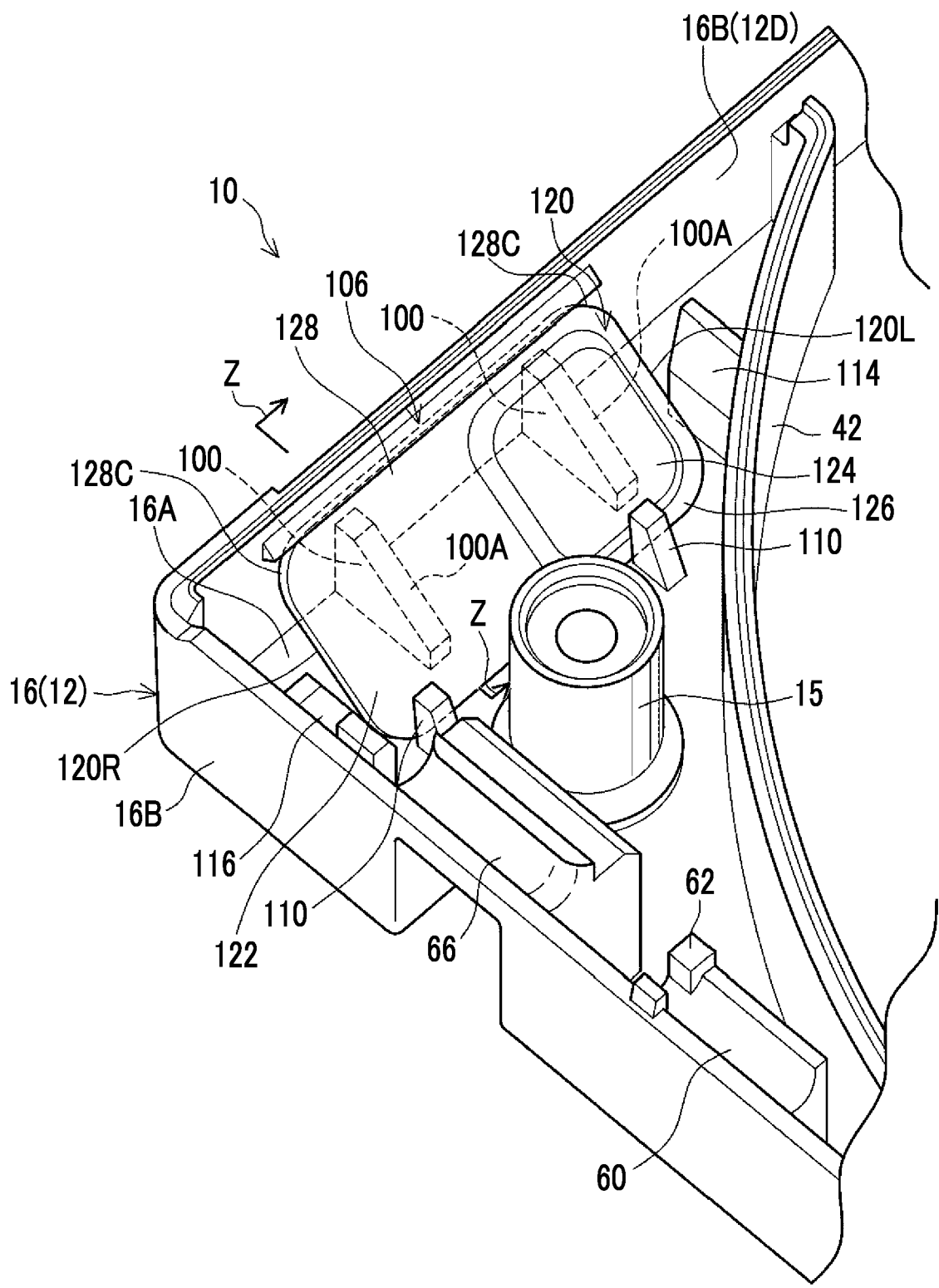
FIG. 10 is a perspective view showing a state after the cartridge memory built into the recording tape cartridge according to the second embodiment is supported by the supporting ribs.
Figure 11:
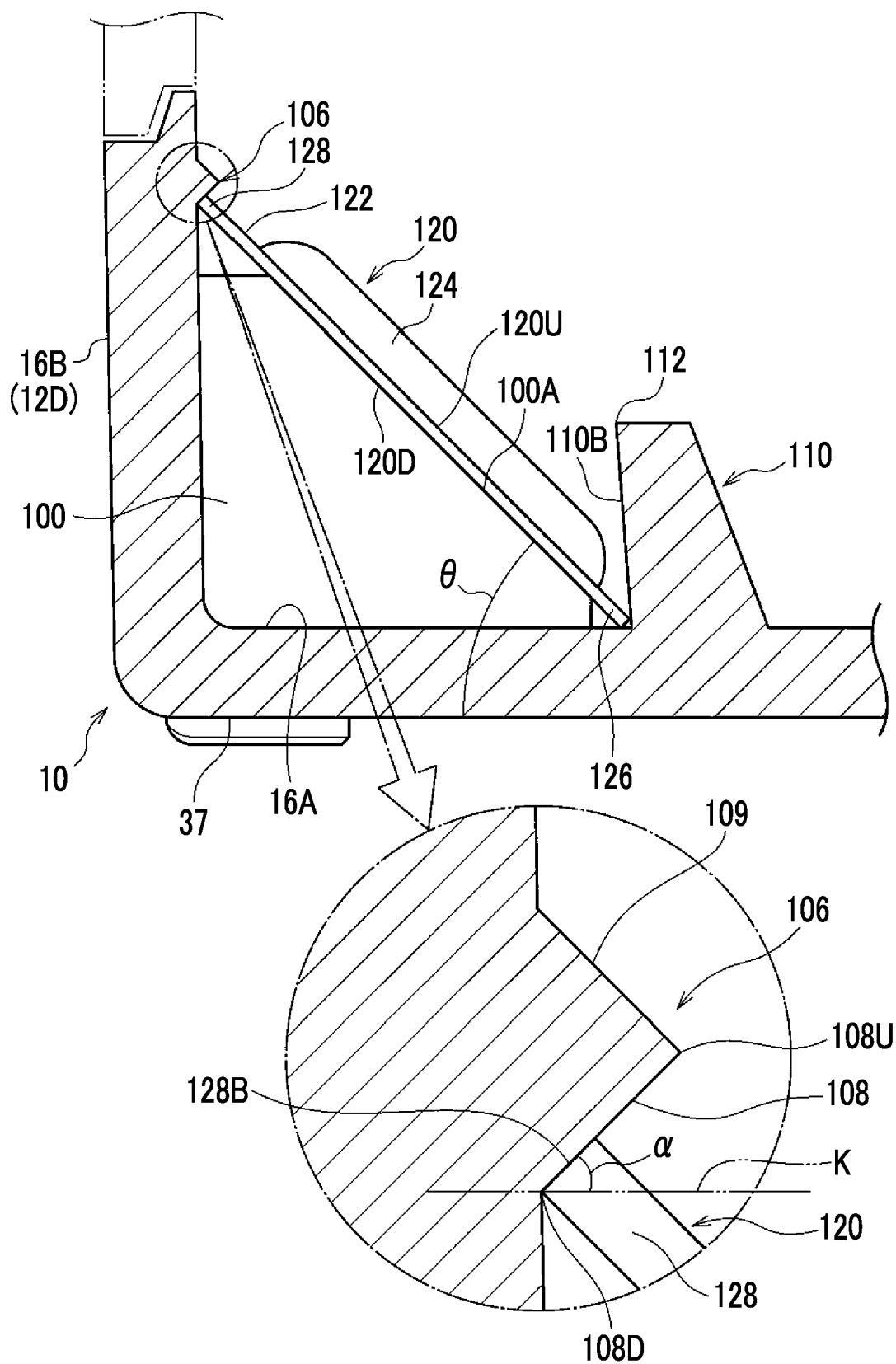
FIG. 11 is a sectional view taken along line Z-Z in FIG. 10 as seen in the arrow direction.

As shown in FIGS. 9 to 11, on the inner surface of the upper portion side of the peripheral wall 16B of the lower case 16, a projecting portion 106 as a retaining portion that retains the upper end portion 128 of the cartridge memory 120 from above is formed. The longitudinal direction of the projecting portion 106 is parallel to the lateral direction and has an approximately right angled triangular shape as seen in a side view.

That is, the projecting portion 106 includes an inclined surface 108 that the upper end surface 128B of the upper end portion 128 of the cartridge memory 120 abuts and an inclined surface 109 that continues from an upper edge portion 108U of the inclined surface 108 and extends obliquely rearward and upward.

In addition, the upper end portion 128 of the cartridge memory 120 is retained by the projecting portion 106 in a state where the position of the lower end portion 126 is restricted by the position restricting ribs 110 and the cartridge memory 120 is held between the projecting portion 106 and the position restricting ribs 110 with the epoxy substrate 122 elastically deformed slightly in a direction along the supporting surfaces 100A.

Note that, as shown in FIG. 11, regarding the projecting portion 106, an angle $\alpha$ formed between the inclined surface 108 and a virtual straight line K that extends through a lower edge portion 108D of the inclined surface 108 and is parallel to the reference surfaces 33, 35, 37, and 39 is similar to the angle $\alpha$ in the first embodiment and $\alpha \leq 0$=approximately 45 degrees. Therefore, the cartridge memory 120 is appropriately retained by the inclined surface 108 (such that upper end portion 128 is not separated from projecting portion 106).

In addition, as shown in FIGS. 9 and 10, the length of the projecting portion 106 in the lateral direction is equal to or larger than the length L of the cartridge memory 120 in the lateral direction (refer to FIG. 4). However, for example, the projecting portion 106 may be formed to have a length such that the upper end portions of the arc-shaped corner portions 128C formed on both the right and left sides of the upper end portion 128 of the cartridge memory 120 do not come into contact with the inclined surface 108 of the projecting portion 106. In addition, the projecting portion 106 may not be continuously formed in the lateral direction and the projecting portion 106 may be intermittently formed.

In a case where the retaining portion is composed of the projecting portion 106 as described above, it is possible to secure the thickness of the peripheral wall 16B of the lower case 16 and thus it is possible to maintain the strength of the lower case 16. Note that, in a case where the retaining portion is composed of the groove portion 102, it is possible to reduce the length of time of forcible extraction in the case of extraction of the lower case 16 from a mold in comparison with a case where there is a protruding shape such as the projecting portion 106. Therefore, it is possible to prevent the mold from being damaged.

Hereinabove, the recording tape cartridge 10 according to the present embodiment has been described based on the drawings. However, the recording tape cartridge 10 according to the present embodiment is not limited to the recording tape cartridge shown in the drawings and the design thereof can be appropriately changed without departing from the gist of the present disclosure. For example, the cartridge memory 120 is not limited to a microcomputer type.

In addition, regarding the cartridge memory 120, a reading and writing operation may not be performed by the noncontact reading and writing device provided in the drive device. In a manufacturing line where the recording tape cartridge 10 is manufactured as well, a reading and writing operation is performed on the cartridge memory 120 by a noncontact reading and writing device provided in the manufacturing line. That is, production history or the like is recorded on the cartridge memory 120 at this time.

In addition, the antenna 130 may be formed on the lower surface 120D of the cartridge memory 120 as long as two recess portions (not shown) having a substantially semicircular arc shape as seen in a side view are formed on a side close to the supporting surfaces 100A of the supporting ribs 100 while being separated from each other vertically and the antenna 130 is prevented from coming into contact with the supporting surfaces 100A of the supporting ribs 100 due to the recess portions.

In addition, although the two position restricting ribs 110 are provided, the disclosure is not limited thereto and one or three or more position restricting ribs 110 may be provided. In addition, the door 50 is not limited to a flat plate-shaped door of which the trajectory is linear as seen in a plan view and may be an approximately arc-shaped door of which the trajectory has an approximately arc shape as seen in the plan view, for example.

What is claimed is:

1. A recording tape cartridge comprising:
    a case that is configured by causing a peripheral wall of an upper case and a peripheral wall of a lower case to abut against each other and accommodates a reel on which a recording tape is wound;
    a reference surface that is formed on the lower case and serves as a reference in an axial direction of the reel in a case where the case is loaded into a drive device;
    a noncontact communication medium on which individual information is recorded, the noncontact communication medium being accommodated in the lower case and having a plate shape;
    a supporting portion that is formed on the lower case and supports the noncontact communication medium such that the noncontact communication medium is disposed while being inclined with respect to the reference surface at an angle of approximately 45 degrees;
    a position restricting portion that is formed on the lower case and restricts a position of a lower end portion of the noncontact communication medium; and
    a retaining portion that is formed on the lower case and retains an upper end portion of the noncontact communication medium, wherein:
    the retaining portion is composed of a groove portion that is formed on the peripheral wall of the lower case,
    the groove portion includes a first inclined surface at which an upper end surface of the upper end portion of the noncontact communication medium abuts and a second inclined surface that contacts the lower surface of the upper end portion of the noncontact communication medium, and
    in the groove portion, $\alpha \leq \beta$ and $\alpha \leq \theta$=approximately 45 degrees, where an angle formed between the first inclined surface and a virtual straight line K that extends through the lower edge portion of the first inclined surface and is parallel to the reference surface is $\alpha$ and an angle formed between the second inclined surface and the virtual straight line K is $\beta$.

2. The recording tape cartridge according to claim 1, wherein the position restricting portion includes an overlapping portion that projects to a position above the noncontact communication medium.

3. The recording tape cartridge according to claim 1, wherein the noncontact communication medium is disposed with an antenna facing an upper side, and
    the retaining portion retains a peripheral edge portion of the upper end portion at which the antenna is not formed.

4. The recording tape cartridge according to claim 1, wherein the upper case is not provided with a portion that comes into contact with the noncontact communication medium.

* * * * *